United States Patent [19]
Minott et al.

[11] Patent Number: 5,828,797
[45] Date of Patent: Oct. 27, 1998

[54] FIBER OPTIC LINKED FLAME SENSOR

[75] Inventors: George L. Minott, Wilton; Jonathan C. Plimpton, Canterbury, both of N.H.

[73] Assignee: Meggitt Avionics, Inc., Manchester, N.H.

[21] Appl. No.: 666,042

[22] Filed: Jun. 19, 1996

[51] Int. Cl.⁶ .................................................. G02B 6/32
[52] U.S. Cl. .......................... 385/12; 385/115; 385/147; 250/227.23; 356/44
[58] Field of Search ............................. 385/12, 115, 147; 356/43, 44; 250/227.23

[56] References Cited

U.S. PATENT DOCUMENTS

| | | | |
|---|---|---|---|
| 4,657,386 | 4/1987 | Suarez-Gonzalez et al. | 356/45 |
| 4,799,787 | 1/1989 | Mason | 356/43 |
| 5,164,600 | 11/1992 | Das et al. | 250/227.23 |
| 5,257,496 | 11/1993 | Brown et al. | 60/39.06 |
| 5,419,636 | 5/1995 | Weiss | 385/12 |

OTHER PUBLICATIONS

Wm Michael Glasheen, et al. "Combustor Flame Sensor With High Temperature Electronics", Jun. 5–8, 1995, Presentet at International Gas Turbine and Aeroengine Congress and Exposition, Houston, Texas.
Conax Buffalo Corporation Description, International Gas Turbine Institute, The American Society of Mechanical Engineers, p. 47.
NASA, Technical Support Package for Tech Brief LAR–14900., "Acoustical Detection of Flameout in a Combustor", pp. 1, 7, and 8. [No Date].
Rosemount Aerospace Inc. Company Description, International Gas Turbine Institute, The American Society of Mechnaical Engineers, p. 117 Machine Design, News Trends, "GE Fabricates Silicon–Carbide ICs", Jul. 25, 1994.
Deidre E. Cusack, et al., Ametek Aerospace Products, Inc, Flame Indication Sensors Operate At Temperatures Above 500° C., pp. 1–6 [No Date].
"Solar–Blind UV Photodiodes Go Filterless", Sensors, May 1995, p. 12.
"GaN UV Sensor Detects Fire Even under Fluorescent Lights", William Arden, APA Optics, Inc. [No Date].

Primary Examiner—Akm E. Ullah
Assistant Examiner—Ellen E. Kang
Attorney, Agent, or Firm—Lorusso & Loud

[57] ABSTRACT

A fiber optic linked flame sensor for continuous optical monitoring of the combustion process within the combustion chamber of a gas turbine engine. The system includes a high temperature optical probe, a fiber optic cable, and electro-optics module. The high temperature probe is mounted on the engine skin and sighted in a manner so as to view the combustion process taking place at its origin just aft to the fuel nozzle. The appropriately constructed fiber optic cable connects the high temperature probe with the electro-optics module. The radiation transmitted via the fiber optic cable is then received by an ultraviolet photodiode located in the electro-optics module and coupled with appropriate electronics.

21 Claims, 5 Drawing Sheets

THE ULTRAVIOLET EMISSIONS FROM JP-4 BURNING AT SEA LEVEL

FIG. 7

SILICON CARBIDE UV PHOTODIODE

FIBER OPTIC LINKED FLAME SENSOR

FIELD OF THE INVENTION

This invention relates to a flame sensor, and especially to a solid state, fiber optic linked flame sensor which is particularly useful in connection with sensing the flame in gas turbine combustors.

BACKGROUND OF THE INVENTION

Historically, the potential for gas turbine combustor flame-outs has been recognized as one of the major risks associated with operating a gas turbine engine. Damage to the engine occurs when fuel continues to be fed into the hot combustion chamber in the absence of a controlled flame. Subsequent re-ignition of the fuel, caused by fuel in contact with hot surfaces, can result in an explosion. Therefore, if a flame-out occurs, the fuel supply must be shut off quickly, or otherwise controlled, so as to prevent fuel build-up and the potential explosive hazard.

The problem of flame-out in gas turbine engines has been exacerbated, in part, as a result of manufacturer's attempts to come into compliance with federal regulations stemming from the Clean Air Act. As a result of the Clean Air Act, manufacturers have had to reduce pollutants such as nitrous oxide, sulphur dioxide, and unburned hydrocarbons, resulting from combustion processes. To accomplish this, a variety of technologies have been used including: adjustments of air-to-fuel ratio (i.e., lean-burn conditions), use of water or steam injection into the combustion chamber, adjustments/control for the combustor flame temperature, and adjustment of the combustion inlet temperature.

In many cases, however, one of the consequences resulting from achieving a clean burn is the accompanying instability in the flame chemistry. The unstable flame conditions increase the risk of unintended flame-outs. Thus, in recent years, the potential for the occurrence of flame-outs has increased as a result of attempts to provide cleaner burning engines. Rapidly responsive and reliable flame sensors have, therefore, become extremely important in the design and operation of gas turbine engines.

Prior art flame detection systems which have been used to monitor various gas turbine combustion processes include thermocouples, gaseous discharge ultraviolet detectors, and, more recently, silicon carbide (SiC) ultraviolet detectors. Thermocouples are used in the combustion chamber area as well as in the exhaust gas stream. In addition to having too slow of a response time to adequately sense flame-outs, and thus prevent potential damage, thermocouples do not hold up well in the highly oxidizing atmosphere of a gas turbine combustion chamber. Also, due to mounting location problems and response time characteristics, thermocouple technology is difficult to use effectively in a feed back mode to control the emission properties of the combustion process.

Gaseous discharge ultraviolet detectors have been used successfully in the past on larger non-aircraft derivative gas turbine power generation stations. These devices and their associated circuitry can detect the presence and/or absence of flame within 100 milliseconds. However, the nature of the way the pulse counting data streams are generated, which can themselves fluctuate due to the statistical behavior of these devices, makes it very difficult to quantitatively evaluate the changes in the flame intensities.

Also, by their nature, gaseous discharge devices used in a constant conduction mode as would exist in combustion chamber flame monitoring applications, do not enjoy a long life span. This is due to continuous ionic bombardment (sputtering) of the devices' electrodes which adversely affects their performance characteristics. Additionally, unburned hydrocarbon particulates can absorb the ultraviolet radiation, thus undesirably limiting the spectral sensitivity of a gaseous discharge detector in the range from about 200 nanometers (nm) to approximately 260 nm.

Silicon Carbide ultraviolet (UV) detectors have received recent attention in the art due primarily to their ability to withstand high temperatures compared to conventional silicon-based devices. Current SiC systems are, however, very expensive due primarily to the fact that the entire system, including all of the associated electronics, must be designed for high temperature and vibration performance.

Thus, there remains a long felt need in the art for a flame sensor for continuous monitoring of the flame(s) in the combustor of a gas turbine engine which is capable of reliably detecting a flame-out condition in a cost-effective manner.

OBJECTS OF THE PRESENT INVENTION

Accordingly, it is an object of the present invention to provide a novel fiber optic flame sensor which is capable of reliably and rapidly sensing a flame-out condition in the combustor of a gas turbine engine.

It is another object of the present invention to provide a novel fiber optic flame sensor which is capable of reliably and rapidly sensing a flame-out condition in the combustor of a gas turbine engine through the use of a solid state UV sensor.

A further object of the present invention to provide a novel fiber optic flame sensor which is capable of reliably and rapidly sensing a flame-out condition in the combustor of a gas turbine engine in a cost-effective manner.

Yet another object of the present invention to provide a novel fiber optic flame sensor which is capable of reliably and rapidly sensing a flame-out condition in the combustor of a gas turbine engine in a cost-effective manner using a silicon carbide ultraviolet detector.

Still another object of the present invention to provide a novel fiber optic flame sensor which is capable of reliably and rapidly sensing a flame-out condition in the combustor of a gas turbine engine without the need for pulse discrimination or pulse conditioning circuitry.

These and other objects of the present invention will become apparent from a review of the following detailed description of the invention, taken together with the drawing, in which like reference numbers refer to like members throughout the different views.

SUMMARY OF THE INVENTION

According to the present invention, there is provided a fiber optic linked flame sensor which provides a rapid and reliable response to a flame-out in the combustion chamber of an engine in a cost efficient manner. The flame sensor includes an optical probe having a sight tube bore with a first and a second opening. The optical probe is adapted to be fixed within the combustion chamber with the first opening of the sight tube bore adjacent an engine flame to receive radiant energy emitted from the engine flame into the sight tube bore. In a preferred embodiment, the probe includes a braze-sealed sapphire window within the sight tube bore, and a fused silica lens fixed between the sapphire window and the second opening.

A first end of a fiber optic cable is connected to the second opening of the sight tube bore, and an electro-optics module is connected to a second end of the fiber optic cable. The electro-optics module receives radiant energy from the sight tube bore through the fiber optic cable. A solid state ultraviolet photodiode, preferably a silicon carbide photodiode, within the electro-optics module converts the radiant energy to an electrical signal indicative of the presence of the flame within the combustion chamber.

Preferably, the optical probe has a first end adjacent the first opening formed of Hastelloy X, and a second end adjacent the second opening formed of Kovar. The fiber optic cable preferably includes: a plurality of individual optical fibers; a fiberglass cloth covering the optical fibers; and a stainless steel braid covering the fiberglass cloth. Each of the individual fibers of the fiber optic cable include: a pure fused silica core; a cladding of doped fused silica over the core; and a gold or polyimide buffer over the cladding.

A preferred embodiment of the electro-optics module includes focusing optics between the second end of said fiber optic cable and the solid state ultraviolet photodiode for focussing the radiant energy onto the active area of the photodiode. In addition, a UV optical bandpass filter may be used between the focusing optics and the solid state ultraviolet photodiode to filter undesired emissions.

According to the invention, a method of detecting the occurrence of a flame-out in an engine flame within a combustion chamber of a gas turbine engine is also provided. The method includes the steps of providing a fiber optic linked flame sensor as described above; mounting the optical probe of the flame sensor within the combustion chamber adjacent the engine flame; mounting the electro-optics module of the flame sensor in a position remote from the combustion chamber; and monitoring the electrical signal provided by the electro-optics module for a flame-out indication.

DETAILED DESCRIPTION OF THE INVENTION

The present invention will be described herein in connection with its use on ground-based aeroderivative gas turbine engines. It is to be understood, however, that this system, or one modified for a specific application, could be used to monitor the combustion processes in military and commercial aircraft engines. In fact, such modifications would be readily apparent to one skilled in the art.

Figure 1:
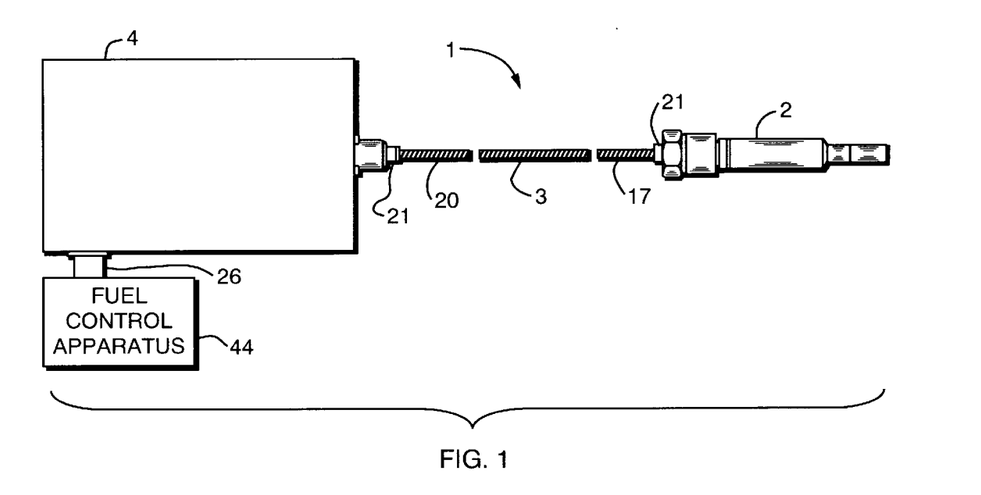
FIG. 1: is plan view of a fiber optic linked flame sensor according to the invention.

Turning now to FIG. 1, according to the present invention a fiber optic flame sensor 1 for monitoring the presence and intensity of the flame(s) in the combustor section of a gas turbine engine generally consists of three component sections; a high temperature probe 2, a fiber optic cable 3, and an Electro-Optics Module 4 (E.O.M.). As will be described in detail below, the high temperature probe 2, mounts directly on the engine and extends into the combustion chamber to act as a sight pipe. The fiber optic cable 3 transfers the radiant electromagnetic energy emitted by combustion flame from the probe 2 to the E.O.M. 4. The E.O.M. 4 contains solid state electronics for converting a selected wavelength region of the radiant electromagnetic energy to an electrical signal which is monitored, in a known manner, to determine the presence or absence of the combustion flame.

Although the present invention is described in connection with detecting the presence or absence of flame, it could also be used with a feed back control mechanism (not shown) to assist in the reduction of pollutants. The steady state nature of the output signal from the solid state photodiode could allow the combustion process to be fine-tuned with relation to emissions. For example, by correlating the signal output changes associated with increases and decreases in flame temperature (proportional to changes in flame intensities) with pollutant content of the emission stream, one could develop a feed back mechanism to control the combustion process.

Figure 2:
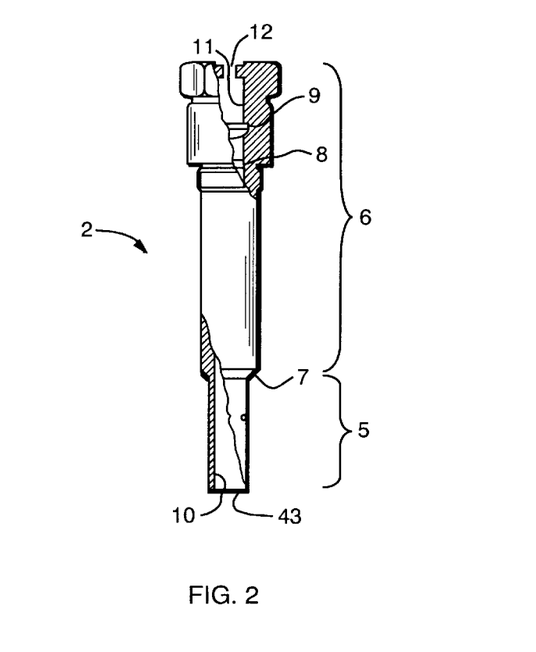
FIG. 2: is a partial side-sectional view of an optical probe according to the present invention.

Turning now to FIG. 2, the probe 2 is constructed of high temperature materials that withstand the intense temperatures associated with the high pressure combustor process. Preferably, the end portion 5 of the probe 2 which extends into the combustion chamber is constructed of Hastelloy X due to its high temperature performance characteristics. The end portion 5 is fixed to a base section 6 of the probe by a weld 7. The base section is preferably constructed of Kovar to match the expansion characteristics of the brazed sapphire window insert 8.

The probe 2 acts as a sight pipe into the combustion chamber and contains a braze-sealed sapphire window 8 and a fused silica lens 9. Radiant energy is transferred from the combustion flame into the sight tube bore 10 of the probe 2 through opening 43, and then through opening 12 to the fiber optic cable. In the preferred embodiment, the probe 2 has an overall length of about 4.8", and the sight tube opening 10 has 0.44" inside diameter and a 0.56" outside diameter.

The sapphire window 8 is braze-sealed to a Kovar ring, which then is welded into the Kovar section 6. The sapphire window seal is capable of withstanding gas temperatures of 900° F. at pressures reaching 500 psi. This window, therefore, acts as the protective barrier separating the combustion process from the other optical system components. The fused silica lens 9, plano convex in the preferred configuration, focuses the radiant emission energy from the combustion process into the acceptance angle of the fiber optic cable 3, the tip of which is inserted into opening 12. The interior walls 11 of sight tube bore 10 where the optical components 8, 9 reside, are plated with gold to help prevent oxidative contaminants from fouling the optical surfaces.

Figure 3:
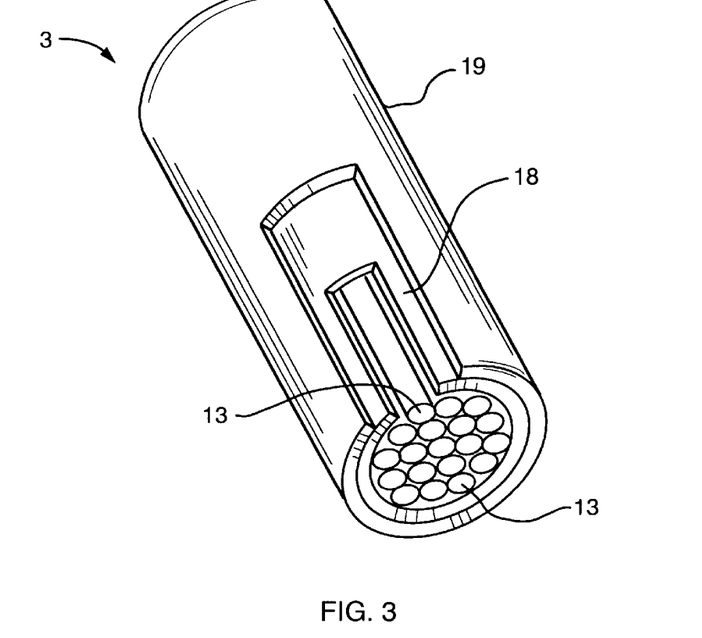
FIG. 3: is a partial cut-away view of a fiber optic cable according to the present invention.
Figure 4:
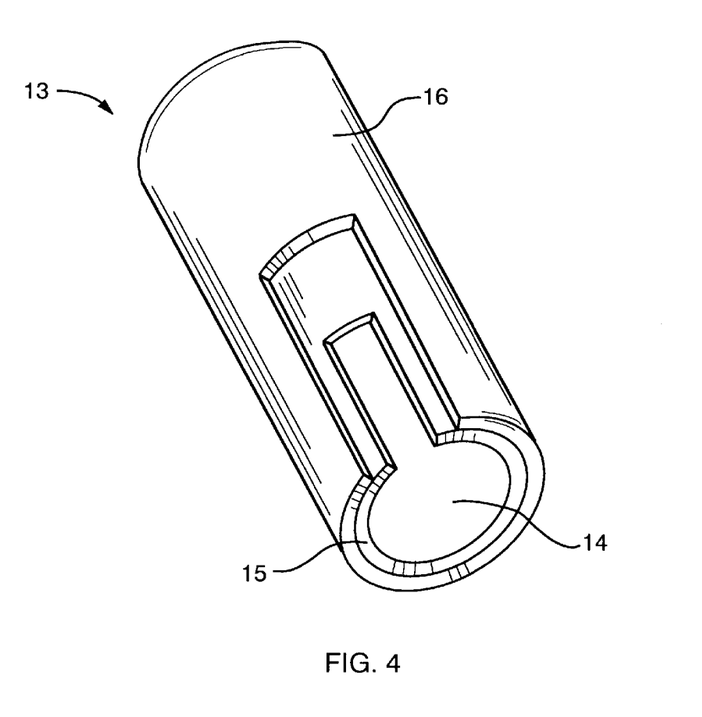
FIG. 4: is a partial cut-away view of an individual optical fiber within the fiber optic cable shown in FIG. 3.

The fiber optic cable 3 transfers the radiant energy projected through the high temperature probe window 8, from the combustion flame to the Electro-Optics Module 4 (E.O.M.). Referring to FIG. 3, the fiber optic cable 3 is composed of nineteen individual fused silica optical fibers 13, and is preferably about fifteen feet in length. As shown in FIG. 4, the individual fibers 13 have a pure fused silica core 14 which is 200 micrometers (microns) in diameter. Over the core 14 is a cladding 15 composed of doped fused silica 10 microns thick. The cladding 15 is covered by a buffer 16 of either polyimide or gold in a thickness of 10 microns. In the first few inches, preferably about six inches, of the fiber optic cable at the high temperature probe end 17 (FIG. 1) of the cable, a gold buffer 16 rated at 900° F. is used. The remainder of the cable is provided with a polyimide buffer 16, rated at 540° F.

As shown in FIG. 3, the group of nineteen fibers 13 is closely packed in a hexagonal arrangement and sheathed in fiber glass cloth 18 and a stainless steel braid 19. The ends of the cable 17, 20 are terminated in stainless steel ferrules 21 (FIG. 1) of a proper shape and size to interface with the high temperature probe 2 on one end 17, and the E.O.M. 4 on the other end 20.

Figure 5:
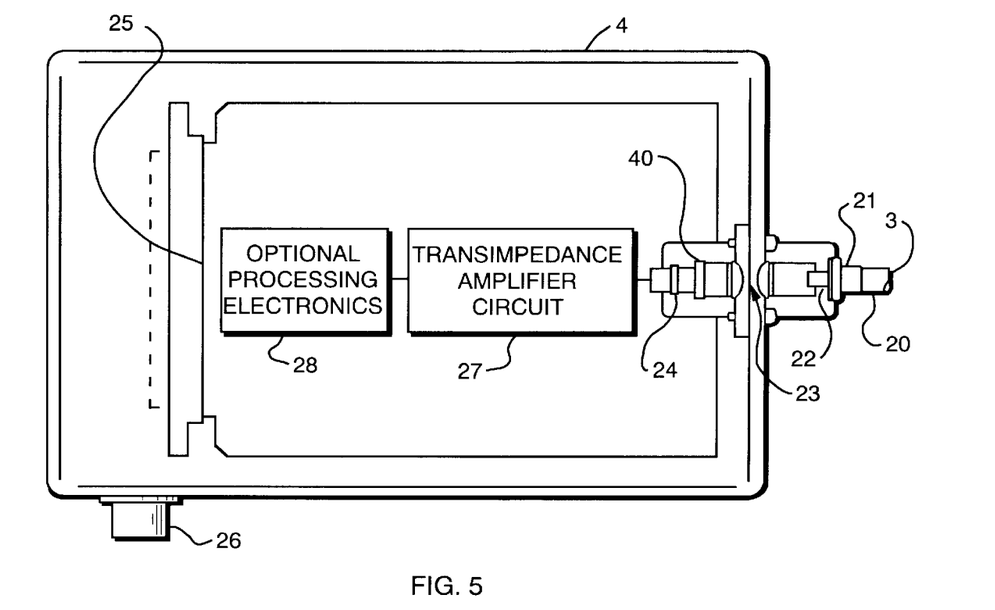
FIG. 5: is a plan view in partial block diagram form of an electro-optics module according to the invention.

Turning to FIG. 5, the Electro Optics Module 4 (E.O.M.) is located at the so-called low temperature end 20 of the fiber optic cable. The ambient temperature where the E.O.M. is located is no greater than 125° C., thus permitting conventional, low cost electronics to be used in the E.O.M. The function of the E.O.M. is to convert the UV radiation transmitted from the combustor flame through the fiber optic cable 3 into an electrical output signal. To accomplish this, the tip 22 of the low temperature end 20 of the fiber optic cable 3 directs electromagnetic radiation with the aid of focusing optics 23 onto the active area of a solid state UV sensor 24 mounted on a circuit board 25. Input and output to the circuit board is provided through a port 26 on the E.O.M. The port 26 is preferably connected to a known fuel control apparatus 44 (FIG. 1). On the occurrence of a flame-out condition, the absence of radiant energy at the sensor 24 causes the E.O.M to provide an electrical signal, in a known manner, to the fuel control apparatus 44 to halt the supply of fuel to the fuel nozzle.

The preferred solid state UV sensor 24 is a Silicon Carbide (SiC) UV photodiode. This detector is available in small quantities through Cree Research, Durham NC. In larger quantities, they can be obtained through Cree's distributor in Germany (Endrich Bauelemente). These are able to be packaged in TO-18 or TO-5 transistor cans. The sensor 24 is part of a transimpedance amplifier circuit 27 and generates a voltage output signal proportional to the intensity level of the UV radiation received within a specific spectral bandwidth. In addition to containing the UV sensor 24 and amplification electronics 27, the E.O.M. also may contain processing electronics 28, depending on a user's requirements.

Alternative detectors include, Gallium Nitride (GaN) UV detector available from APA Optics, Inc., Minneapolis, Minn., and Silicon-on-Insulator technology based UV photodiodes available from Spire Corporation, Bedford, Mass. These solid state UV detectors have a spectral response from 200 nanometers (nm) to approximately 375 nm. Optical filtering of standard UV-enhanced silicon photodiodes, to restrict the spectral bandwidth to the region previously described, produces unacceptably low detector output signals since such filters must reject radiation outside the passband to 1150 nm, and since they intrinsically show both low transmission and restricted bandwidth. The net result of using a UV-enhanced silicon detector, together with an optical bandpass filter in this application is an unacceptably low signal-to-noise ratio.

Figure 7:
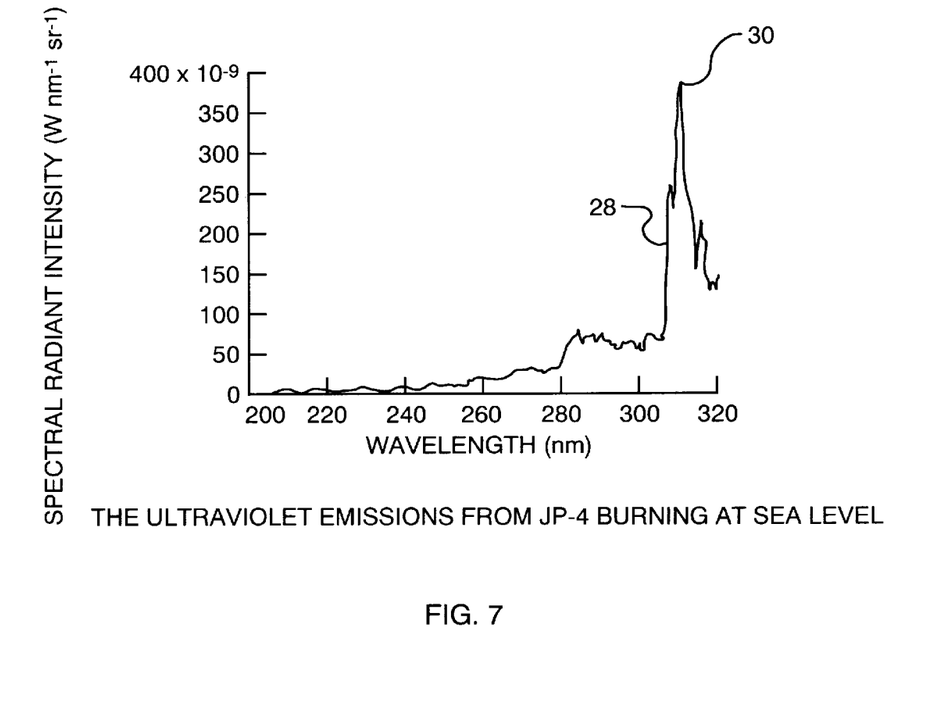
FIG. 7: is a plot of the UV spectral radiant intensity of burning hydrocarbon fuel.
Figure 8:
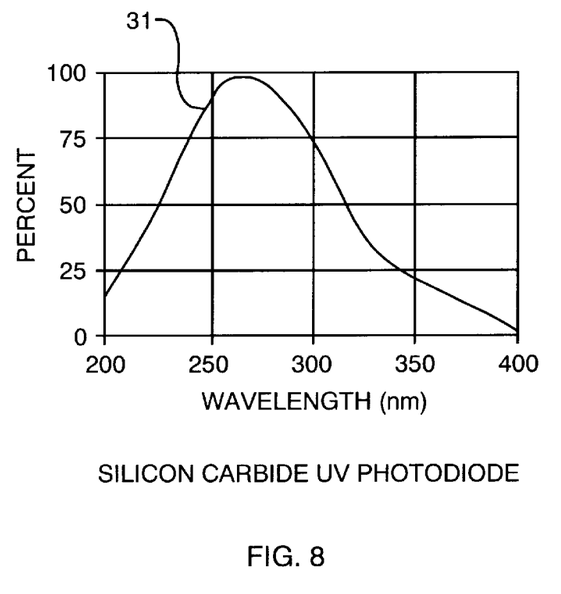
FIG. 8: is a plot of the typical spectral response of a silicon carbide UV photodiode useful in connection with the present invention.

Advantageously, however, the SiC UV photodiode detector 24 has been found to have a UV spectral response which is extremely favorable in detecting the presence of a flame in a combustor. Referring to FIG. 7, there is shown a plot 29 of the radiant emission energy from a burning hydrocarbon fuel. As can be seen, there is a dramatic spike 30 in the spectral radiant intensity of the emission at 310 nm. As shown in FIG. 8, the spectral response 31 for a typical SIC UV photodiode 24 extends over the IV spectral region of from about 200 nm to about 375 nm for reliably detecting the 310 nm emission of the burning hydrocarbon.

Figure 9:
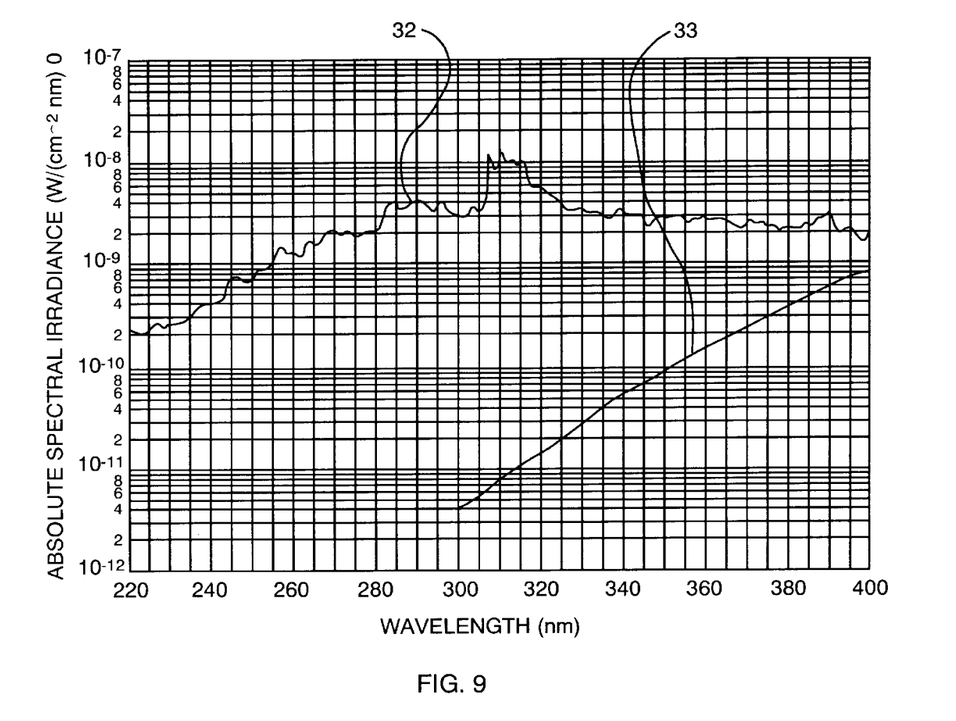
FIG. 9: is a plot of showing the spectral irradiance differences between a bench-top propane bunsen burner source and a 1900° K. graybody.

Moreover, although the SiC UV photodiode 24 exhibits an advantageous UV spectral response, bench testing has shown that the response of the SIC UV photodiode to a 1900° K. source is sufficiently less than the response to a propane flame from a bench-top bunsen burner. The ratio of the signal generated from response to the propane is in the order of 100:1 with respect to the response signal generated from the 1900° K. body noise signal. FIG. 9 demonstrates the spectral irradiance differences between the bench-top propane bunsen burner source (at 32) and the 1900° K. graybody (at 33) used in the previously mentioned signal ratio example. These measurements were made on a NIST traceable calibrated optronics Laboratories Model 746D Spectral Radiometer.

Figure 6:
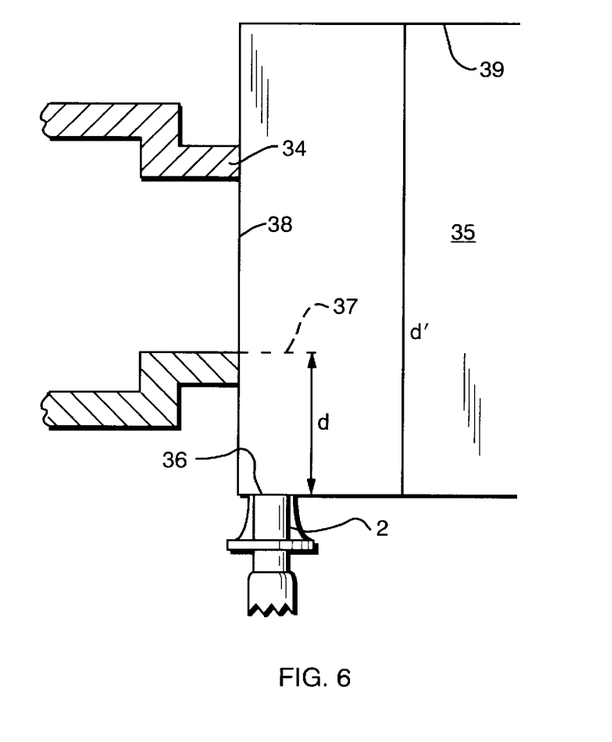
FIG. 6: is a side sectional view of a combustor of a turbine engine showing the placement of an optical probe according the present invention.

Turning to FIG. 6, there is shown the orientation of a probe 2 to a fuel nozzle 34 within a combustion chamber 35. Preferably the probe 2 is fixed within an ignitor port or a pilot flame port 36 at a distance d of about 2.5" to 2.75" from the expected location 37 of the flame edge extending from the fuel nozzle orifice 38. Typically, the temperature of the background wall 39 of the combustion chamber which is at a distance d' of about 8" to 9" from the probe 2, does not exceed 1300° K. Thus, the SiC UV photodiode response to the background wall 39 in the combustion chamber 35 will be significantly less that the response to the UV radiant emission energy of the flame. The SiC UV photodiode can, therefore, be used do detect the presence or absence of a flame without the need for an associated optical bandpass filter, to filter undesired background radiation from the combustor walls. The system according to the invention, therefore, relies solely on the spectral response of the SiC UV photodiode to detect the flame and respond to flame-out conditions. This represents a significant improvement over prior art devices in terms of cost savings since output pulse conditioning electronics, such as used with gas discharge-type UV sensors, are simply not necessary.

Even though filtering electronics are not necessary according to the invention, an optional UV optical bandpass filter 40 (FIG. 5) of appropriate bandwidth, or short pass filter of appropriate half power point, transmission and environmental properties could be placed in front to the SiC diode to further improve signal-to-noise ratio if required. In addition, since the spectral response range of the SiC photodiode is considerably more narrow than that of a UV-enhanced silicon photodiode, optical filters can be obtained which provide high transmission while providing rejection outside the desired passband. In the preferred state of the invention, however, no optical filter would be used in front of the SiC detector since, in the absence of an optical filter, an acceptable level of signal-to-noise can be obtained in the intended application, and a simpler and lower cost system is afforded.

Advantageously, the present invention provides a fiber optic link from the probe 2 within the combustion chamber 35 to the SiC UV photodiode detector 24 within the E.O.M 4. The E.O.M is thus remoted from the high heat and vibration environment of the engine by about 15 feet in the preferred embodiment. As a result, the E.O.M. may be constructed of lower cost electronic components as compared to electronics which are designed to withstand high temperature and vibration environments. This is in contrast to the intended use of SiC devices since these devices were designed for high temperature use. In the present invention, the SiC diode is used for its spectral response rather than its ability to withstand high temperature. The system according to the invention is, therefore, much less expensive to produce since the fiber optically remoted E.O.M. can be constructed without filtering electronics, and without high temperature and vibration hardened electronics.

Figure 10:
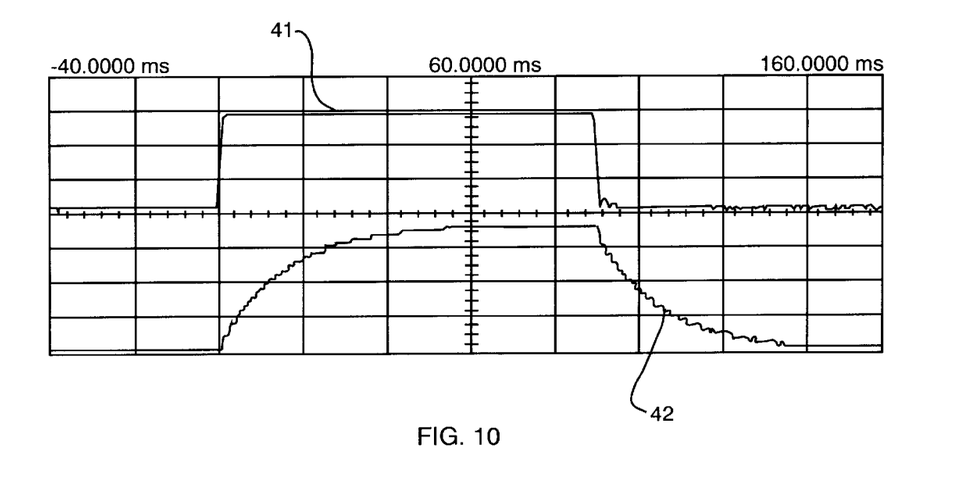
FIG. 10: is a plot of showing the response of a system according to the invention to a simulated flame-out condition.

At the same time, the present invention provides a rapid and reliable response to a flame-out condition in less than 50 milliseconds. FIG. 10 clearly demonstrates the ability of the invention to respond quickly, i.e. less than 50 milliseconds rise time, to a bench-top propane flame. The step actuation of a high-speed mechanical shutter is shown as waveform 41. The system response to closing the shutter to obscure the flame from the probe is shown as wave form 42. The rise time of the waveform 42 in response to the simulated flame-out condition is about 33.9 ms.

There is thus provided a fiber optic linked flame sensor which provides rapid, reliable, and inexpensive optical monitoring of the combustion process within the combustion chamber of a gas turbine engine. The embodiments which have been described herein, however, are but some of the several which utilize this invention, and are set forth here by way of illustration but not of limitation. It is obvious that many other embodiments which will be readily apparent to those skilled in the art may be made without departing materially from the spirit and scope of this invention.

What is claimed is:

1. A fiber optic linked flame sensor for monitoring a combustion process within an engine combustion chamber comprising:
    an optical probe having a sight tube bore formed therein, said sight tube bore having a sapphire window disposed therein and having a first opening and a second opening, said optical probe being adapted to be fixed within said combustion chamber with said first opening adjacent an engine flame to receive radiant energy emitted from said engine flame into said sight tube bore,
    a fiber optic cable having a high temperature end and a low temperature end, said high temperature end of said fiber optic cable being connected to said second opening of said sight tube bore; and
    an electro-optics module connected to said low temperature end of said fiber optic cable to receive said radiant energy from said sight tube bore through said fiber optic cable, said electro-optics module comprising a silicon carbide photodiode for converting said radiant energy to an electrical signal, said electrical signal being indicative of the presence of said flame within said combustion chamber.

2. A fiber optic linked flame sensor according to claim 1, wherein said optical probe further comprises a lens fixed within said sight tube bore between said sapphire window and said second opening, and wherein said sight tube bore is gold-plated between said sapphire window and said lens.

3. A fiber optic linked flame sensor according to claim 1, wherein said fiber optic cable comprises:
    a plurality of individual optical fibers;
    a fiberglass cloth covering said optical fibers; and
    a stainless steel braid covering said fiberglass cloth.

4. A fiber optic linked flame sensor according to claim 1, wherein said fiber optic cable comprises a plurality of individual optical fibers, wherein each of said individual optical fibers comprises:
    a core;
    a cladding over said core;
    a gold buffer over a first portion of said cladding adjacent to said high temperature end of said fiber optic cable; and
    a polyimide buffer over a second portion of said cladding adjacent to said low temperature end of said fiber optic cable.

5. A fiber optic linked flame sensor according to claim 1, wherein said electro-optics module comprises focusing optics between said low temperature end of said fiber optic cable and said photodiode for focusing said radiant energy onto said photodiode.

6. A fiber optic linked flame sensor according to claim 5, wherein said electro-optics module comprises a UV optical bandpass filter between said focusing optics and said photodiode.

7. A fiber optic linked flame sensor according to claim 1, wherein said sight tube bore is gold-plated along at least a portion thereof between said sapphire window and said second opening of said sight tube bore.

8. A fiber optic linked flame sensor for monitoring a combustion process within an engine combustion chamber comprising:
    an optical probe having a sight tube bore formed therein, said sight tube bore having a first opening and a second opening, said optical probe having a first end adjacent said first opening formed of Hastelloy X, and a second end adjacent said second opening formed of Kovar, said optical probe being adapted to be fixed within said combustion chamber with said first opening adjacent an engine flame to receive radiant energy emitted from said engine flame into said sight tube bore,
    a fiber optic cable having a first end and a second end, said first end of said fiber optic cable being optically connected to said second opening of said sight tube bore; and
    an electro-optics module connected to said second end of said fiber optic cable to receive said radiant energy from said sight tube bore through said fiber optic cable, said electro-optics module comprising a silicon carbide ultraviolet photodiode for converting said radiant energy to an electrical signal, said electrical signal being indicative of the presence of said flame within said combustion chamber.

9. A method of detecting the occurrence of a flame-out in an engine flame within a combustion chamber of a gas turbine engine comprising:
    providing a fiber optic linked flame sensor, said flame sensor comprising: an optical probe having a sight tube bore formed therein, said sight tube bore having a sapphire window disposed therein and having a first opening and a second opening, said optical probe being adapted to be fixed within said combustion chamber with said first opening adjacent an engine flame to receive radiant energy emitted from said engine flame into said sight tube bore,
    a fiber optic cable having a high temperature end and a low temperature end, said high temperature end of said fiber optic cable being connected to said second opening of said sight tube bore; and an electro-optics module connected to said low temperature end of said fiber optic cable to receive said radiant energy from said sight tube bore through said fiber optic cable, said electro-optics module comprising a silicon carbide photodiode for converting said radiant energy to an electrical signal, said electrical signal being indicative of the presence of said flame within said combustion chamber;

mounting said optical probe of said flame sensor within said combustion chamber adjacent said engine flame;

mounting said electro-optics module of said flame sensor in a position remote from said combustion chamber; and monitoring said electrical signal.

10. A method according to claim 9, wherein said optical probe further comprises a lens fixed within said sight tube bore between said sapphire window and said second opening, and wherein said sight tube bore is gold-plated between said sapphire window and said lens.

11. A method according to claim 9, wherein a first end of said optical probe adjacent said first opening is formed of Hastelloy X, and a second end of said optical probe adjacent said second opening is formed of Kovar.

12. A method according to claim 9, wherein said fiber optic cable comprises:

a plurality of individual optical fibers;

a fiberglass cloth covering said optical fibers; and a stainless steel braid covering said fiberglass cloth.

13. A method according to claim 9, wherein said fiber optic cable comprises a plurality of individual optical fibers, wherein each of said individual optical fibers comprises:

a core;

a cladding over said core;

a gold buffer over a first portion of said cladding adjacent to said high temperature end of said fiber optic cable; and a polyimide buffer over a second portion of said cladding adjacent to said low temperature end of said fiber optic cable.

14. A method according to claim 9, wherein said electro-optics module comprises focusing optics between said low temperature end of said fiber optic cable and said photodiode for focusing said radiant energy onto said photodiode, and a UV optical bandpass filter between said focusing optics and said photodiode.

15. A method according to claim 9, wherein the ambient temperature at said position remote from said combustion chamber is no greater than 125° Celsius.

16. A fiber optic linked flame sensor according to claim 9, wherein said sight tube bore is gold-plated along at least a portion thereof between said sapphire window and said second opening of said sight tube bore.

17. A fiber optic linked flame sensor for monitoring a combustion process within an engine combustion chamber comprising:

an optical probe having a sight tube bore formed therein, said sight tube bore having a first opening and a second opening, said optical probe being adapted to be fixed within said combustion chamber with said first opening adjacent an engine flame to receive radiant energy emitted from said engine flame into said sight tube bore, a fiber optic cable having a first end and a second end, said first end of said fiber optic cable being connected to said second opening of said sight tube bore; and an electro-optics module connected to said second end of said fiber optic cable to receive said radiant energy from said sight tube bore through said fiber optic cable, said electro-optics module comprising a solid state ultraviolet photodiode for converting said radiant energy to an electrical signal, said electrical signal being indicative of the presence of said flame within said combustion chamber, wherein a first end of said optical probe adjacent said first opening is formed of Hastelloy X, and a second end of said optical probe adjacent said second opening is formed of Kovar.

18. A method of detecting the occurrence of a flame-out in an engine flame within a combustion chamber of a gas turbine engine comprising:

providing a fiber optic linked flame sensor, said flame sensor comprising:

an optical probe having a sight tube bore formed therein, said sight tube bore having a first opening and a second opening, said optical probe being adapted to be fixed within said combustion chamber with said first opening adjacent an engine flame to receive radiant energy emitted from said engine flame into said sight tube bore, a fiber optic cable having a first end and a second end, said first end of said fiber optic cable being connected to said second opening of said sight tube bore; and an electro-optics module connected to said second end of said fiber optic cable to receive said radiant energy from said sight tube bore through said fiber optic cable, said electro-optics module comprising a solid state ultraviolet photodiode for converting said radiant energy to an electrical signal, said electrical signal being indicative of the presence of said flame within said combustion chamber, wherein a first end of said optical probe adjacent said first opening is formed of Hastelloy X, and a second end of said optical probe adjacent said second opening is formed of Kovar;

mounting said optical probe of said fame sensor within said combustion chamber adjacent said engine flame;

mounting said electro-optics module of said flame sensor in a position remote from said combustion chamber; and monitoring said electrical signal.

19. A method according to claim 18, wherein the ambient temperature at said position remote from said combustion chamber is no greater than 125° Celsius.

20. A fiber optic linked flame sensor for monitoring a combustion process within an engine combustion chamber comprising:

an optical probe having a sight tube bore formed therein, said sight tube bore having a first opening and a second opening, said optical probe being adapted to be fixed within said combustion chamber with said first opening adjacent an engine flame to receive radiant energy emitted from said engine flame into said sight tube bore;

a fiber optic cable having a high temperature end and a low temperature end, said high temperature end of said fiber optic cable being connected to said second opening of said sight tube bore, said fiber optic cable comprising a plurality of individual optical fibers, each of said individual optical fibers comprising:

a core, a cladding over said core, a gold buffer over a first portion of said cladding adjacent to said high temperature end of said fiber optic cable, and a polyimide buffer over a second portion of said cladding adjacent to said low temperature end of said fiber optic cable; and an electro-optics module connected to said low temperature end of said fiber optic cable to receive said radiant energy from said sight tube bore through said fiber optic cable, said electro-optics module comprising a solid state ultraviolet photodiode for converting said radiant energy to an electrical signal, said electrical signal being indicative of the presence of said flame within said combustion chamber.

21. A method of detecting the occurrence of a flame-out in an engine flame within a combustion chamber of a gas turbine engine comprising:

providing a fiber optic linked flame sensor, said flame sensor comprising:

an optical probe having a sight tube bore formed therein, said sight tube bore having a first opening and a second opening, said optical probe being adapted to be fixed within said combustion chamber with said first opening adjacent an engine flame to receive radiant energy emitted from said engine flame into said sight tube bore, a fiber optic cable having a high temperature end and a low temperature end, said high temperature end of said fiber optic cable being connected to said second opening of said sight tube bore, said fiber optic cable comprising a plurality of individual optical fibers, each of said individual optical fibers comprising:

a core, a cladding over said core, a gold buffer over a first portion of said cladding adjacent to said high temperature end of said fiber optic cable, and a polyimide buffer over a second portion of said cladding adjacent to said low temperature end of said fiber optic cable, and an electro-optics module connected to said low temperature end of said fiber optic cable to receive said radiant energy from said sight tube bore through said fiber optic cable, said electro-optics module comprising a solid state ultraviolet photodiode for converting said radiant energy to an electrical signal, said electrical signal being indicative of the presence of said flame within said combustion chamber;

mounting said optical probe of said flame sensor within said combustion chamber adjacent said engine flame;

mounting said electro-optics module of said flame sensor in a position remote from said combustion chamber; and monitoring said electrical signal.

* * * * *